United States Patent [19]

Fletcher et al.

[11] 4,007,430
[45] Feb. 8, 1977

[54] CONTINUOUS PLASMA LASER

[76] Inventors: James C. Fletcher, Administrator of the National Aeronautics and Space Administration, with respect to an invention of; Willard F. Libby, Los Angeles, Calif.; Carl A. Jensen, Davis, Calif.; Lowell L. Wood, Simi, Calif.

[22] Filed: Aug. 10, 1971

[21] Appl. No.: 170,544

Related U.S. Application Data

[60] Division of Ser. No. 866,442, Oct. 14, 1969, Pat. No. 3,617,804, which is a continuation of Ser. No. 479,357, Aug. 12, 1965, abandoned.

[52] U.S. Cl. .................... 331/94.5 D; 331/94.5 G; 331/94.5 PE
[51] Int. Cl.$^2$ .......................................... H01S 3/00
[58] Field of Search ................ 331/94.5 D, 94.5 G, 331/94.5 PE

[56] References Cited

UNITED STATES PATENTS

| | | | |
|---|---|---|---|
| 3,395,364 | 7/1968 | Bridges | 331/94.5 |
| 3,413,568 | 11/1968 | Gordon et al. | 331/94.5 |

OTHER PUBLICATIONS

*Handbook of Chemistry and Physics,* The Chemical Rubber Company, 44th Edition, 1962–1963, p. 3097.
Gordon et al: "Continuous Visible Laser Action in Singly Ionized Argon, Krypton and Xenon," *Applied Physics Letters* vol. 4, May 15, 1964, pp. 178–180.

*Primary Examiner*—Edward S. Bauer
*Attorney, Agent, or Firm*—Monte F. Mott; Wilfred Grifka; John R. Manning

[57] ABSTRACT

A method and apparatus for producing intense, coherent, monochromatic light from a low temperature plasma are disclosed. The apparatus includes a housing for confining a gas at subatmospheric pressure and including a set of reflectors defining an optical cavity. At least one anode and cathode are positioned within the gas. First control means control the voltage applied to the anode and second control means independently control the temperature of the cathode. The pressure of the gas is controlled by a third control means. An intense monochromatic output is achieved by confining the gas in the housing at a controlled pre-determined reduced pressure, independently controlling the temperature of the electron emitting cathode and applying a predetermined controlled low voltage to the anode. An intermediate mode current is drawn from the cathode and produces in the confined gas, a region having a high density of metastable atomic states leading to a population inversion. A low temperature, high-density plasma is continuously produced in said region leading to laser emission between said reflectors. Intense, coherent monochromatic light is emitted as a result of the recombination of ions and electrons in the plasma.

11 Claims, 5 Drawing Figures

CONTINUOUS PLASMA LASER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

CROSS-REFERENCE TO RELATED APPLICATIONS

The present application is a divisional of Ser. No. 866,442, filed Oct. 14, 1969, (now U.S. Pat. No. 3,617,804), which in turn is a stream-lined continuation of Ser. No. 479,357, filed Aug. 12, 1965 and now abandoned.

BACKGROUND OF THE INVENTION

1. Field of the invention

This invention relates to a method and apparatus for producing both noncoherent and coherent intense monochromatic light from a continuous low temperature plasma. More particularly, this invention relates to a method and apparatus for the production of radiation in the form of intense monochromatic light from a continuous low temperature plasma generated in a region having a high density of atoms in metastable atomic states and in which the neutralization of ions by recombination with electrons proceeds at a very rapid rate. By selecting the gas it is possible to produce light at many different wavelengths. The use of helium to give 584-A ionizing light is an example of an interesting case. The method and apparatus are applicable both to noncoherent light sources and to coherent light sources of the commonly called lasers.

2. Description of the Prior Art

As has been set forth by two of the inventors in an article entitled, "Intense 584-A Light From a Simple Continuous Helium Plasma," which was originally published in Volume 135, No. 5-A of "The Physical Review" at pages A-1247 through A-1252 on Aug. 31, 1964, the importance of ionizing radiation in inducing chemical reactions is widely recognized. An intense monochromatic source of light in the far ultraviolet region is highly desirable in space research to study the chemical effects of solar ionizing ultraviolet radiation. Such a source, of course, also has many other scientific and industrial applications which are well known to those skilled in the art. It should be noted, for example, that the particular source described herein is also suitable for use as a vacuum ultraviolet laser when hydrogen or helium three is used in combination with helium four as will become apparent from the discussion below. Of course, the more common laser wavelengths may also be induced by an appropriate selection of gases and conditions, i.e., temperature, pressure, current, voltage, and magnetic field intensity.

OBJECTS AND SUMMARY OF THE INVENTION

It is therefore an object of this invention to provide a method and apparatus for producing intense monochromatic light from a continuous plasma source.

It is a more particular object of this invention to provide a method and apparatus for producing a monochromatic source of ultraviolet light of very short wavelengths having an intensity per unit of bandwidth which is greater than has heretofore been available. Depending on the environment this light may or may not be coherent, such as "laser" light is.

Briefly stated in very general terms these objects are achieved by producing, in a continuous plasma formed by a gas confined at reduced pressure, a region having a high density of atoms in metastable atomic states and/or as ions. Upon recombination of the ions and electrons in the plasma high energies are released in the form of intense radiations. The ions are usually formed as result of a high density of metastable states. The metastable states and/or the ions may be made to form population inversions which may lead to the production of coherent electromagnetic radiation.

In "The International Dictionary of Physics and Electronics" published by D. Van Nostrand Company, New York, 1961, at page 741 there is given a discussion of the "metastable state" which defines the sense in which the term is used herein. Broadly speaking, this state is one in which a system has acquired energy beyond that for its most stable state yet has become relatively stable in this high energy condition. Familiar daily examples of this phenomenon are the fact that water at atmospheric pressure may be heated several degrees above its normal boiling point and yet not boil until the system is disturbed from some external source. In the metastable state the water has received energy beyond that normally required for liquid-vapor equilibrium and yet has not become unstable. The system will, however, flash into steam when it is disturbed. This term has similarly been used in atomic and nuclear physics to designate excited atomic states from which all possible quantum transitions to lower states are partially or completely forbidden transitions by the appropriate selection rules. The method and apparatus for producing a plasma having a region of high density of metastable atomic states and/or ions (which may be considered as a variety of a metastable state) to generate an intense ultraviolet or other light will be described in detail below.

In the drawings, wherein like reference characters refer to like parts throughout:

BRIEF DESCRIPTION OF THE DRAWINGS

FIG. 5 is a view showing a laser of the type shown in FIG. 1 also including magnetic field generating means.

DESCRIPTION OF THE PREFERRED EMBODIMENTS

Figure 1:
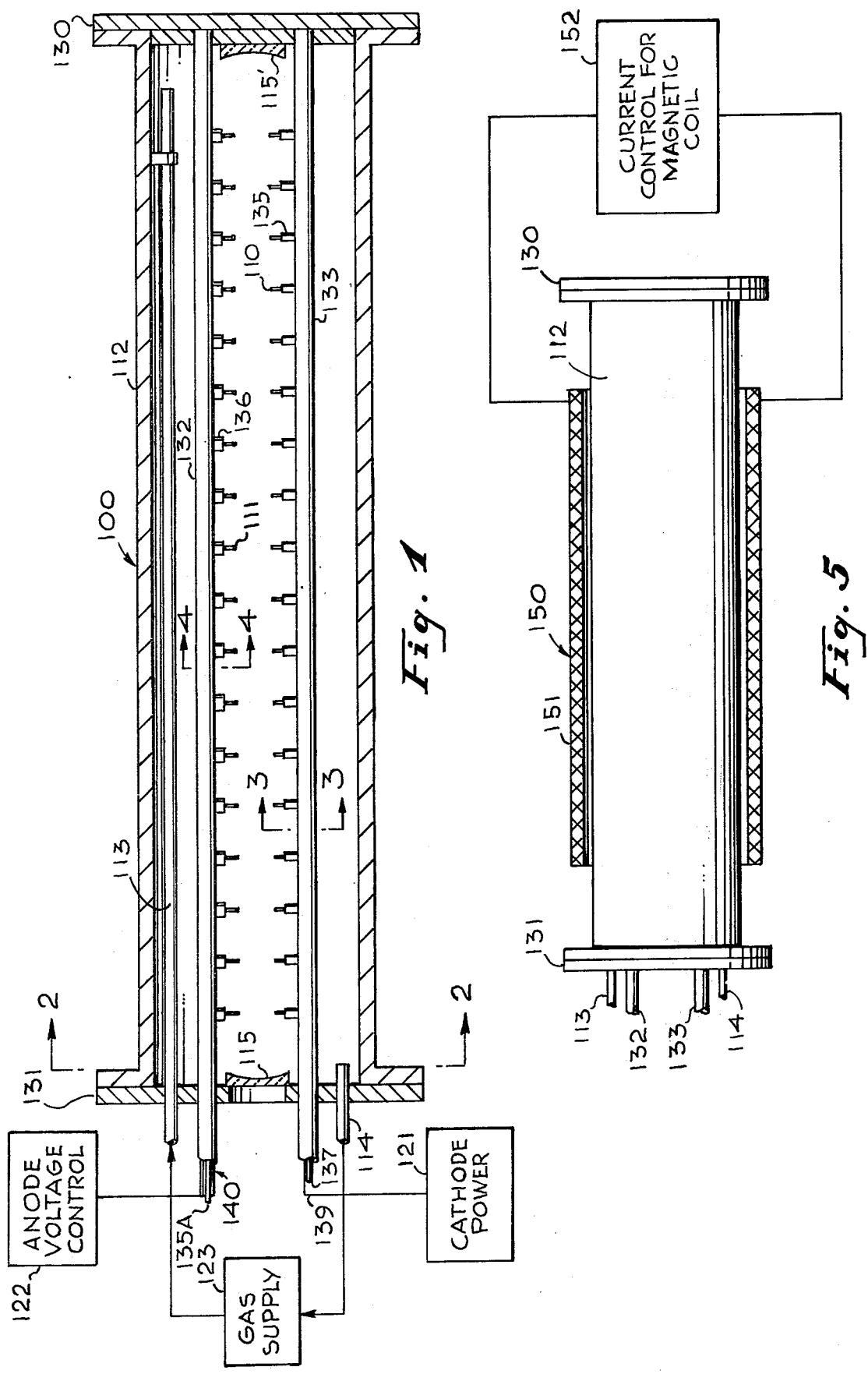
FIG. 1 is a cross-sectional side elevation of an embodiment of the laser light source apparatus according to the invention.

The laser light source according to the invention comprises in combination: housing means to confine a gas at a pressure below atmosphere; at least one anode and one cathode positioned in said gas in electrical circuit relationship with each other; first control means to control the voltage applied to the anode; second control means to control the temperature of the cathode by regulating power supply to it; third control means to control the pressure of said gas; said first, second and third control means being arranged to function independently of each other to permit independent control of the temperature and density of the plasma formed in said gas when an intermediate mode current is drawn from said cathode to said anode and optical means to establish a preferred light direction for stimulated emission of radiation to obtain laser action. The laser apparatus may also include means to cool the anode and cathode support and magnetic field generation means to produce a magentic field along the preferred light direction.

As an illustration of the plasma producing system of the invention, the hot cathode can be manufactured from a 3-cm long, 0.010-inch diameter thoriated tungsten wire positioned parallel to and 1-cm from a 3-cm long, 0.020 inch diameter tantalum wire serving as the anode. For helium gas the pressure should be maintained between 30 and 1,000 microns typically 300 microns. When the anode voltage is controlled between 20 and 100 volts, and the current from the cathode is more than 0.10 ampere but less than 100 amperes, an intermediate mode current is drawn. Monochromatic light in the far ultraviolet at 584-A is emitted, when 30 volts were applied to the anode and one ampere of current flowed between the anode and cathode at 300 microns pressure.

The device has three current modes depending on cathode temperature, anode voltage and helium pressure. In the low current mode the device operates as a vacuum diode tube. The intermediate current mode of a hundred or more milliamperes to a few tens of amperes is the condition in which the device operates as desired and as described herein. In the high current mode the device shows negative resistance and operates as a low pressure arc discharge device in which a current of more than 100 amperes is drawn. In the intermediate current mode the internal resistance of the device is positive and affords stable operations without the use of an external resistance. In the high current mode an external resistance is needed for stable operation.

The desired intermediate-current mode of operation of the device is defined not only by the above-noted current flow of more than 100 milliamperes but less than 100 amperes, but also by the fact that this current mode is achieved by maintaining the tungsten cathode at on the order of 2500° K or more, by applying an anode voltage in the range of 20 to 100 volts for helium gas at a pressure of approximately 300 microns and the electrode spacing, type, and geometry described here. If the anode voltage exceeds 100 volts the device goes into the high current mode under the conditions described here. The onset of the high current mode will depend on the nature of the use, the system geometry, and other system parameters such as the pressure. More generally the intermediate current mode is that set of operating conditions under which the device carries many times the space charge limited current of a similar device operating in a vacuum, but the resistance of the device is still positive. The high current or arc state, on the other hand, is defined as the negative resistance, region of operation of the device.

The unique emission characteristics of the device in the intermediate current mode state are believed to be related to the fact that it is operated with a very hot cathode which provides abundant electrons and hence high currents at relatively low anode voltages. There is thus provided an abundant supply of low energy electrons. This in turn results in a dense low temperature plasma and an excited atomic state region in which metastable atomic states occur abundantly. In this region there is rapid production of an recombination of ions and electrons and each recombination in turn eventually produces a photon. Thus, the photon flux density from transition going to the ground state of the principal gas under conditions which do not radically shift or broaden the light emitted by the atoms excited directly or via the metastable states, but not the ions, is proportional to the recombination rate which is high in the present high density plasma arrangement. On the other hand, the line width or bandwidth of the emitted radiation is an exponential function of the temperature. Hence, the low temperature plasma produced under the above-noted conditions will result in a monochromatic emission of high intensity, which is able to escape complete resonance trapping in its own parent gas.

Figure 2:
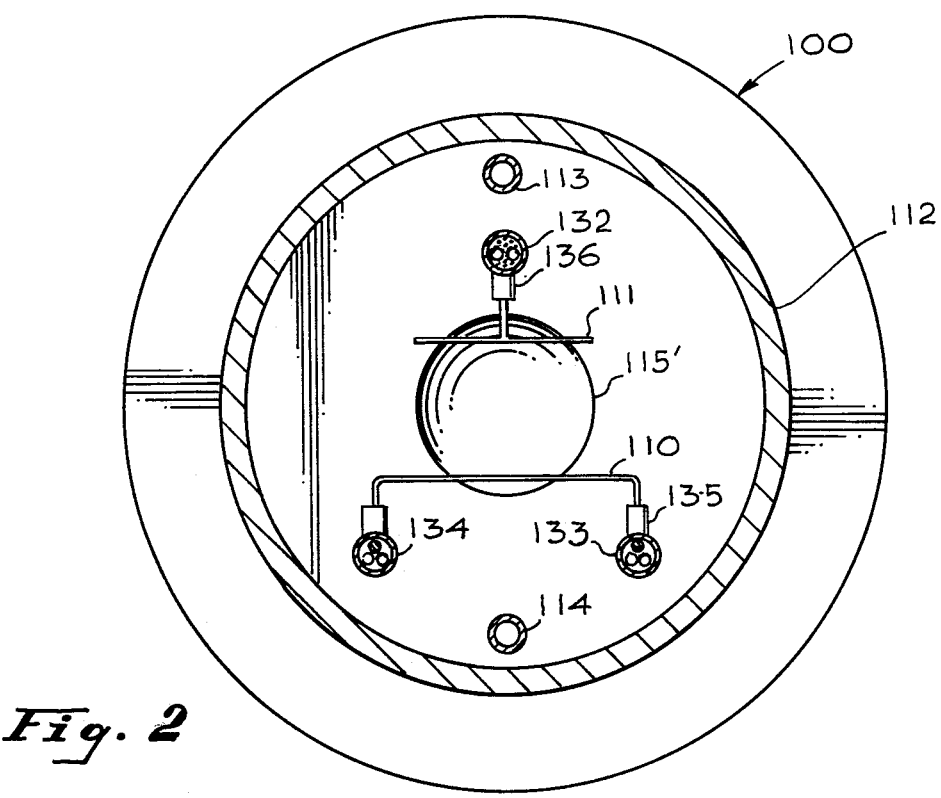
FIG. 2 is a sectional end elevation on the line 2—2 of FIG. 1.
Figure 3:
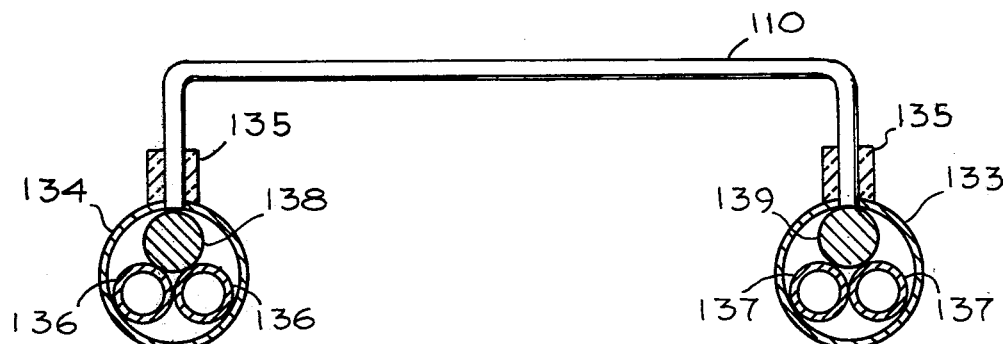
FIG. 3 is an enlarged cross-sectional view of the cathode supporting conduit shown in FIG. 1.

As will be explained in detail below, the region around the electrodes has been observed to have a high density of metastable atomic states which, of course, are predecessors of the ions. Such an inverted population which holds here for the ions as well as for the metastable states is known to afford the basis for laser action. The device may be used with natural gases such as helium, neon, krypton, xenon, hydrogen, and isotopes of these gases. Gases other than natural helium have been used both alone and by injecting them into the chamber in the presence of or in combination with helium. When, for example, hydrogen at a pressure which is a small fraction of that of the helium, is injected in the presence of the inverted helium population, an inverted population of hydrogen states occurs. This results in the emission of light characteristic of hydrogen, notably the 1216-A Lyman alpha line in the vacuum ultraviolet. When an arrangement, such as mirrors in an optical cavity, is provided, which provides or tends to provide a preferred direction for the stimulation of radiation, "laser" action results and coherent light will be produced. Such arrangements are shown in FIGS. 1 and 2 which will be described in detail below.

It has been found that substantially the same operating conditions will optimize the light intensity and the number of metastable states. In previously known plasma generating devices only two variables have been available for control to produce inverted populations: (1) the gas pressure and (2) the electric field strength. In the present device in in addition to controlling these two factors, the heated cathode also affords control over the cathode temperature to permit the generation of low energy electrons. The current and the plasma temperature in the device of the present invention are thus necessarily a function of the cathode temperature, the field strength and the pressure rather than simply the field strength and pressure alone.

Thus, in the above described particular exemplary embodiment it was found that if the pressure drops to less than 50 microns or if the cathode temperature is too low to cause significant emission, or if the anode voltage falls to less than about 22 volts, the device drops into the low current mode. The transition is gradual in the case of varying cathode temperature, but very abrupt with variation in pressure or anode voltage. A drop of less than one-tenth of a volt on the anode will cause the current to change from many amperes to a few milliamperes. With very pure helium and well-outgassed electrodes the process is reversible at the same voltage; otherwise there is a hysterisis effect and higher starting voltage is necessary, although again the current goes from milliamperes to amperes in about one-tenth volt.

Within the intermediate current mode range, anode current is determined primarily by cathode temperature. Anode voltage has little effect once it has been raised past the striking level. Separation between cathode and anode has been increased up to 7-cm with no appreciable increase in anode voltage required. The limiting factor on the current is the amount of heat the anode can dissipate before it melts, or the heat the lead in conductors can dissipate.

In the intermediate current mode the source resistance is positive and therefore no resistance is required in series with it to give stable operation. With a very stable low output impedance power supply there was no evidence of oscillation up to frequencies of 100 megacycles per second. The high current mode occurs when anode potentials are increased to several hundred volts. This is a typical low pressure arc and a resistor must be placed in series with the source to obtain stable operation.

The intensity of 584-A light is greatest from the cathode region. The helium 584-A light intensity is also roughly proportional to current flow and inversely proportional to anode voltage. The maximum intensity is obtained at around 300 microns of helium pressure for the particular configuration described with respect to the exemplary embodiment. The 1216-A hydrogen Lyman alpha line is emitted when hydrogen gas is introduced into the system. The intensity of the Lyman alpha line depends mainly on the helium/hydrogen ratio and the anode voltage as well as on the purity of the helium gas and the cleanliness of the vacuum system. It is generated when impurity molecules containing hydrogen give electrons to the $He^+$ ions because of the higher ionization potential of helium or when hydrogen receives energy from collisions of the second kind with metastable helium atoms. When using mass-spectrographic grade helium or helium evaporated from the liquid, the Lyman alpha intensity was about the same as the 584-A intensity in terms of numbers or photons per second. It is for this reason that we believe anode cooling would reduce the Lyman alpha intensity dramatically.

There is a weak doublet of unknown origin at 1300-A and a few other very weak lines below 200-A. Above 2000-A the other helium emission lines and a few impurity lines appear. The spectrum resembles that produced by a radio-frequency discharge source. No evidence of light from the $He_2^+$ molecule ion is seen. (See R. W. Motley and A. F. Kuckes, Proceedings of the Fifth International Conference on Ionization Phenomena in Gases, Munich, 1962 (North-Holland Publishing Co., Amsterdam, 1962), Vol. P. 651). The source is clean in several regions where $He_2^+$ bands would appear, especially in the 600–900-A region and also for the 5133-A band, and they are not observed.

Various different electrode geometries have been investigated as well as varying numbers of electrodes. The intensity of 584-A radiation remains roughly the same for a given current. Since the light comes, we believe, from bound states formed by ion-electron recombination, the ion densities are not appreciably altered by the number or arrangement of electrodes; nor does the ion density vary rapidly in going from cathode to anode.

It should be realized that conditions may vary somewhat from those heretofore described when it is desired to produce "laser" or coherent light. Experiments, which have been performed but not yet published in any technical paper or other news media, establish that a device such as shown in FIG. 1 may be used to produce very intense beams of coherent light on a continuous basis. In such an arrangement it is desirable to use a plurality of electrodes in order to increase the current capacity and hence the power output of the laser. While it is true that the intensity for a given current is independent of the number of electrodes, it is also true that the magnitude of the current which can be drawn is limited by the heat which the anode can dissipate and that increasing the number of anodes will thus increase the total current capacity of the device.

It has also been shown that this laser light may be easily modulated in intensity at frequencies suitable for communication and that laser action may be produced at exceptionally short wavelengths, such as 1216-A hydrogen alpha, or at helium 584-A wavelengths appropriately shifted by Doppler, Stark, isotope, or other action so as to effectively create an inverted population for one or more particular energies of systems.

Furthermore, it may be noted that the modification of control features, such as by the addition of high magnetic fields may be used to increase the intensity of the light by any of the above mentioned actions. These laser devices and applications will be described in greater detail below in connection with FIGS. 1 through 5.

PLASMA DENSITY AND TEMPERATURE

Work done on the decaying plasma of the B-1 stellarator at Princeton by Hinnov and Hirschberg has established a convenient and reliable spectroscopic method for determining electron density and temperature. This procedure was used by Robben, Kunkel, and Talbot to determine the ion densities and temperatures in a plasma-jet wind tunnel. This procedure depends on electron-collision-induced transitions being dominant over purely radiative transitions. When this condition is met a kind of thermal equilibrium between electrons and the bound states near the ionization limit is established, providing the difference in energy between any two neighboring bound states be small compared to kT. Then the densities of these bound states, their energies with respect to the ionization potential, and the electron temperature will be related by the Boltzmann equation:

$$\Delta E_{n,m}/kT = 1n(N_n/N_m).$$

$\Delta E_{n,m}$ is the difference in energy between states $n$ and $m$ and $1n(N_n/N_m)$ is the logarithm of the ratio of the densities of the two states.

The densities of these states were determined by measuring the absolute intensities of their spectral lines and dividing these intensities by the corresponding transition probabilities. The transition probabilities were calculated from the same oscillator strengths as used by Robben et al. These are based on theoretical calculations by Bates and Damgaard (See D. R. Bates and A. Damgaard, Phil. Trans. Roy. Soc. (London) A242, 101 (1949)), and (E. Trefftz, A. Schluter, K. Dettmar, and K. Jorgens, Z. Astrophysc. 44, 1 (1957) by both the Coulomb expansion and variational techniques, which agree quite closely.

The absolute intensities of lines up to principal quantum number $n = 9$, were measured. Unfortunately, the spectrograph used was primarily a vacuum ultraviolet instrument and absolute values of line intensities of lines orginating from states higher than $n = 9$ did not prove to be reliable; nor could the point where the lines merged into the continuum be observed, which would have provided a check on calculated electron densities via the Inglis-Teller equation (See D. R. Inglis and E. Teller, Astrophys. J. 90,439 (1939)). Fortunately, the electron temperature was high enough so that the Boltzmann relation held down to states with $n = 5$. The plot of the logarithm of the state density divided by state multiplicity with respect to state energy is shown in FIG. 7 of Ser. No. 866,442. The slope corresponds to a plasma temperature of 1660° K near the cathode. The extrapolation of the line to $E = 0$ gives the logarithm of $(N_n/g_n)e^{-E_n/kT}$. This is related to electron density by the Saha equation:

$$N_e N_i/g_e g_i = N_n/g_n (2\pi m k T/h^2)^{3/2} e^{-E_n/kT},$$

where $N_e$, $N_i$, and $N_n$ are the number densities of the electrons, ions, and bound states, respectively, and the $g$'s are their multiplicities; $-E_n$ is energy of the bound state; $g_e g_i (2\pi m k/h^2)^{3/2} = 1.2 \times 10^{22}$ if $T$ is to be in electron volts.

Since the space-charge limited current of the device is only a few milliamperes in the absence of positive charges, the charge density of the electrons must be essentially balanced by the charge density of the $He^+$ ions for currents of amperes to flow. Therefore, setting $N_e = N_i$ is justified and $$N_e^2 = N_i^2 = 1.2 \times 10^{22} T^{3/2} (N_n/g_n) e^{-E_n/kT}.$$

The average ion density near the cathode is then determined to be $8.4 \times 10^{12}$ ions/cm³ at 30-V anode voltage and 0.6-A anode current. The temperature near the cathode is 1660° K, and the average intensity of 584-A light is $4 \times 10^{15}$ photon/sec/cm³. The ion density near the anode is $5 \times 10^{12}$ cm⁻³ at a temperature of $\sim 1900°$ K. The intensity of 584-A light from the anode region is $\sim 10^{15}$ photons/sec/cm³.

In order to properly interpret the observed intensity of 584-A radiation, it is necessary to determine the extent to which it is resonance imprisoned. Trapped radiation will be scattered out of the acceptance cone of the spectrograph and will not be seen by it. At 300-$\mu$ helium pressure and room temperature the mean free path of 584-A radiation at the resonance peak is 0.0016 cm. Certainly, then much of it is trapped.

At these ion densities, pressures, and temperatures, the principal broadening mechanism is the Doppler effect due to temperature. Since the helium $2^1P$ atoms which have been formed as a result of ionic recombination will be considerably hotter than the neutral helium atoms, their emitted light will be Doppler shifted further and will be expected to travel further through the surrounding helium gas, which is at room temperature. These excited helium atoms will usually have undergone only electronic collisions between the time they are formed from the ions and the time they emit 584-A radiation. They will therefore retain the temperature associated with the ions.

The 584-A photons must travel through 2.5-cm of helium at 300$\mu$ to reach the differential pumping slit, at which point they will not be significantly further scattered in the spectrograph, and their intensity is measured. If one introduces into the light path an additional amount of helium at 300$\mu$ as an absorber, the 584-A radiation will be further attenuated. The extent to which it is attenuated will depend on the temperature of the emitting and absorbing atoms, and on the distance which the light has already traveled through the absorbing helium. The exact relation for the intensity reaching a given point in the absorber, with the assumption that any scattered photons are lost, $$I_\lambda = \int_0^{-\infty} \exp\left\{ -\left[ \frac{Mv^2}{kT\sigma} + P_o\lambda \exp\left(-\frac{Mv^2}{kT_\alpha}\right)\right]\right\} dv$$

$I\lambda$ is the intensity $\lambda$ cm from the emitter, v the velocity of emitting atom toward or away from observer, $T_\sigma$ the temperature of the emitting atom, $T\alpha$ the temperature of absorbing atoms, M the mass of a helium atom, and $P_o$ equals 600 cm⁻¹, the absorption coefficient of 300° K helium at 300-$\mu$ pressure. Thus, it is improper to speak of a mean free path when the absorber is helium, since the absorption is not an exponential function of $\lambda$.

Observations on the 584-A radiation from the helium plasma give $I_{12.5} / I_{2.5} = 0.70$. This is what one would expect for $T_\sigma \approx 1700°$ K. For $T_\sigma \approx 300°$ K $I_{12.5} / I_{2.5} < 0.19$. Therefore we conclude that the emitting atoms are at $\approx 1700°$ K.

At $T_\sigma = 1700°$ K $I_{2.5} / I_o = 0.102$. The average ion density near the cathode is $\sim 10^{13}$ /cm³; however, it is higher, $\sim 2.5 \times 10^{13}$ /cm³, very near the cathode. At $\sim 2.5 \times 10^{-13}$ ions/cm³ the recombination coefficient is $\sim 2.5 \times 10^{-10}$ cm³/sec, taking the value of Bates et al (See G. L. Natason, Zh. Tekhn. Fiz. 29, 1373 (1959) English transl.: Soviet Phys--Tech. Phys., 4,1263 (1960)) which are one-half as large as those of Hinnov and Hirschberg. If one assumed that all of the recombined atoms eventually emit 584-A radiation, due to electronic mixing between the singlet and triplet states, one would then expect to observe.

$$\sim 15 \times 10^{16} \times I_{2.5}/I_o = 1.5 \times 10^{16} \text{ photons/sec/cm}^3.$$

This agrees very well with the observed light intensity and the ion densities calculated above for these regions. On the basis of all of these considerations it is concluded that ionic recombination by reaction (1) is the mechanism of light emission.

However, a further additional point to consider is the extent to which light produced by $2^1 P$ helium atoms excited directly from the ground state would be observed. This cross section for electrons (See D. R. Bates, Atomic and Molecular Process (Acdemic Press, N.Y., 1962, page 262) and 0. Thieme, Z. Physik. 8,412 (1932)) of energies less than 30 volt is less than $1 \times 10^{-18}$ cm². Therefore we expect, at 0.6 amperes and 300-$\mu$ pressure, that less than $3.6 \times 10^{16}$ $2^1P$ excitations would occur in one second. Since $I_{2.5}/I_o$ for $T_\sigma \approx 300°$ K is less than 0.001, one would observe less than $3.6 \times 10^{13}$ 584-A photons per second from this mechanism.

Another point is that the peak in the light intensity is near the cathode. One would not ordinarily think that electrons would achieve the necessary minimum of 21.5 eV so near the cathode when total anode voltage can be as low as 22 volts. However, ions will be concentrated near the cathode and will recombine more rapidly there.

SOURCE MECHANISM

Origin of the ions: Since the space-charge-limited current of the device described in the absence of positive charges is of the order of milliamperes, positive ions must be present to neutralize the space charge in order that currents as large as amperes could flow. Because the source can be operated at potentials significantly below the 24.5 volt ionization potential of helium, it is unlikely that ionization directly from the ground state is involved. A two-step process involving excitation to the $2^3S$ metastable state with a maximum cross section of $4 \times 10^{-18}$ cm$^2$ at 20.5 eV, (See G. J. Schultz and R. E. Fox, Phys. Rev. 106,1179 (1957)) and subsequent ionization by a second electron with a cross section estimated to be $>10^{-16}$ cm$^2$ (by comparing He $S^3S$ to lithium (See H. Funk, Ann. Physik 396,149 (1930)) is possible. Another possibility is the formation of the triplet state followed by triplet-triplet annihilation to produce an ion, electron, and atom in the ground state. The triplet-triplet annihilation cross sections are very large ($\sim 10^{-14}$ cm$^2$) (See A. V. Phelphs and J. P. Molnar, Phys. Rev. 89,1202 (1953)).

The source of Lyman alpha radiation is charge or energy transfer from ions or metastable atoms to impurities containing hydrogen. Thus, the maximum observed Lyman alpha intensity of $\sim 10^{18}$ photons per second is of interest in indicating the total possible rate of production of ions and metastable atoms. However, this Lyman alpha intensity was observed by injecting $H_2$ gas into the system. This cuased the He 584-A line to almost disappear, so that the source mechanism may have been modified somewhat.

LASER DEVICES

Figure 4:
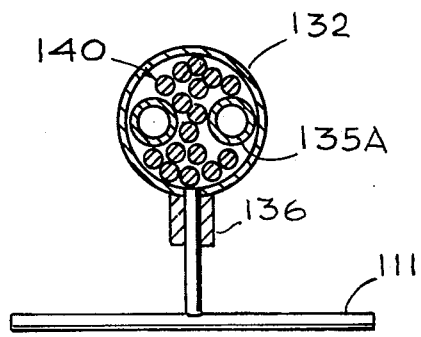
FIG. 4 is a view similar to FIG. 3 but showing the anode supporting conduit.

In FIGS. 1–4, there is shown one detailed embodiment of a laser device 100 incorporating the principles of this invention. The device 100 includes a plurality of cathode wires 110 which are substantially of the same thickness and material. Similarly, the device 100 includes a plurality of anode wires 111. The cathode wires 110 are mounted on any suitable insulators 135 which protrude as bosses from supporting conduits 133 and 134 so as to position the cathode wires as shown in FIGS. 1 and 4. The conduits 133 and 134 are supported in spaced parallel relationship to each other in the lower portion of a vacuum chamber comprising a cylindrical container 112. The conduits and the container may be made of either stainless steel or aluminum. In a typical case the container 112 may be about one meter long and approximately ten or twelve inches in diameter. The ends of the container 112 are closed by circular end plates 130 and 131 which are hermetically fastened to the cylinder 112 in any convenient means as by welding or bolting to a flange, with sealing surfaces such as O-rings.

The conduits 133 and 134 extend through the front plate 131 and are supported by it and by any suitable attachment to the rear plate 130. The conduits 133 and 134 carry water cooling lines 136 and 137 which are preferably arranged so as to form a separate water cooling circuit within each conduit. The conduits 133 and 134 also carry the cathode filament power supply wires 138 and 139 which are connected to a cathode power supply and temperature control unit 121. The cathode elements 110 are connected in parallel across the cathode power lines 138 and 139. Hence, each of the conduits 133 and 134 is required to carry only one electrical conductor.

Similarly, a conduit 132 extends through the upper portion of the front plate 131 and is supported thereby and by attachment to the rear plate 130. The plurality of anode wires 111 are mounted on conduit 132 by insulating bosses 136. Each node wire is suspended substantially at its midpoint by its supporting boss as may be more clearly seen in FIG. 10. The conduit 132 also contains a water cooling circuit 135. A group of electrical conductors 140 is also contained in conduit 132 and are connected in such a fashion that each anode 111 is connected by a separately insulated conductor to a separate and automatically regulated power supply. These separate automatically regulated power supplies are indicated generally by the block 122. Separate power supplies are desirable in order to accommodate minor variations in operating conditions which may occur at different points in the device.

A gas inlet line 113 also extends through the front plate 131 of the device and may desirably continue as to discharge near the rear plate 130. A gas outlet line 114 also extends through the front plate 131 and preferably has its outlet opening positioned near the front plate. The gas lines 113 and 114 are connected externally in closed circuit to a vacuum pump and pressure control device 123. Of course it will be understood that although it is preferable to continuously flow a gas supply through the vacuum chamber of the device at a regulated pressure in order to continuously sweep out impurities which may be generated within the container by operation of the device, nonetheless this feature is not essential to the operation of the device. Although impurities may accumulate under static conditions it is entirely possible for the device to operate with gas confined at an appropriate pressure whether it is flowing or not.

The device 100 includes a plurality of spaced electrodes rather than a single pair of electrodes. This is desirable in order to increase the total current handling capacity of the device. It further differs in that it incorporates an optical system designed to produce laser action by establishing a preferred direction for light output by means of stimulated emission of radiation.

This optical system comprises a circular concave mirror 115 which is mounted in an opening of corresponding size in the front plate 131 so that the mirror provides an hermetic seal for the opening. The mirror 115 is of course either a half silvered or equivalent device having partial transmission characteristics to provide some reflection and some light output. The exact degree of transmission desired is a design detail which is well understood by those skilled in the laser art. The mirror 115 may be either planar of concave. Furthermore, it should be noted that the output opening mirror 115 may in fact be a wholly transmitting plane window where the densities of the plasma become extremely high so that multiple reflections of the forward beam are unnecessary and small fraction of light stimulated in the reverse direction and reflecting off the back mirror 115' is of sufficient intensity for stimulated emission to control the light output.

The other half of the optical system is a corresponding mirror 115' mounted on the back plate 130 of the laser 100 in any convenient mechanical fashion. Again the mirror 115' is shown in the presently preferred form of a concave mirror of the same concavity and diameter as the front mirror 115. Furthermore, it will of course be understood that the two mirrors are aligned so that their optical axes are identical, that is to say, so that the two mirrors are coaxially positioned preferably along the central axis of the cylinder 112 so that they produce a focusing of light through the current flow path between the electrodes 110 and 111. As is also well understood in the art, the distance between these mirrors must be less than the focal length of the mirrors. In a presently preferred embodiment this distance is about one meter and the mirror diameter is about two inches.

Although the vacuum chamber or container 112 has been shown as being formed of a single stainless steel outer wall since such an arrangement gives sufficient radiative dissipation for substantial heat loads, it will nonetheless be understood that the entire chamber could be water jacketed or provided with any other suitable external cooling means should design requirements indicate this to be desirable.

In FIG. 5 there is shown a laser device ⅛which is the same as the device 100 shown in FIG. 1, except that it is additionally provided with an external solenoid coil 151 which is wound around the cylindrical vacuum chamber 112 in such a fashion as to be coaxial with the chamber and to extend substantially along the length thereof in which the electrodes are positioned. The cylinder 112 may be formed of stainless steel or of aluminum. The solenoid 151 is connected to a current supply and control device for the magnetic coil which is identified generally as the block 152. It will of course be understood that this device comprises a power supply with suitable conventional circuitry designed to control the current supplied to the coil in a fashion to be discussed herein. The coil is positioned and designed so as to generate a magnetic field along the axis of the interior of the vacuum chamber 112. The field is thus generally at right angles to the normal electron flow of the device 100 shown in FIG. 1.

The purpose of the magnetic field and the requirements thus placed on its current or power supply are as follows. First, the field may be used to produce a pinching or pulsed effect in the output of the device so as to achieve higher pulsed output levels superimposed on basically continuous operation. In such use, of course, the current supplied to the coil should be supplied in pulses of suitable duration.

Secondly, the coil may have a continuous current of constant amplitude supplied to it so that the magnetic field is used merely to elongate the current path in the device in order to achieve higher electron densities. That is to say, the magnetic field can be used to force electrons from an axially rearward cathode to flow not to their corresponding anode as in previous embodiments, but rather to an axially displaced anode further forward in the device thereby increasing the current path and the electron densities. This mode of operation is desirable since it has been found that the light intensity is proportional to a high power of the current density. In view of these general considerations it will of course be understood that various field configurations which can be produced by varying coil designs may be desirable depending upon exactly what is wanted in any given application.

With respect to both of the devices 100 and 150 of FIGS. 1 and 5, respectively, it will be understood that the mode of operation and the operating conditions with respect to gas pressure, anode potential, cathode power and the like are essentially the same in principle as has been discussed in detail in connection with the exemplary embodiment. Of course the particular design details such as choice of gases, size, power level, etc., will be determined by the particular application for which the device is intended. For example, if the device is to be used as an element in a communications system it would be necessary to provide conventional modulating means to modulate preferably the voltage applied to the anodes. Nonetheless, the physical source mechanism of these laser devices of FIGS. 1 and 5 is essentially the same as that discussed above for the exemplary embodiment in that it is also desirable to operate the laser device in the intermediate current mode in order to produce a low temperature plasma having a high density of metastable states.

Because of the extremely high densities of metastable states attainable in these devices they make an expecially powerful laser. Furthermore, laser action can be obtained with an inverted population involving the ground state. Operating in this mode the laser is much more efficient than any laser constructed heretofore.

Metastable state densities of the order of $10^{13}$ per cubic centimeter are easily obtained with this device operating at relatively low currents. When the device is operated at current densities greater than one ampere per square centimeter the densities of metastable states is higher and approaches $10^{14}$ per cubic centimeter. With these devices as described having a length of about one meter or slightly more than one yard, and using, for example, helium with neon as the gas, it is possible to obtain laser light from the 6328-A neon transition of the order of 100 watts on a continuous basis. With the device as shown in FIG. 5 modified to provide an axial magnetic field so that one either pulses the magnetic field to obtain extremely high densities of emitting states during the pulse period or one uses the magnetic field to direct the current so that it flows in a more longitudinal manner along the axis of the laser, considerably higher power levels are possible. These power levels run to an order of magnitude or two larger than the 100 watts indicated for the device of FIG. 1.

As has been mentioned before the ability to control the density and the temperature of the plasma independently of each other is especially beneficial. This particular feature of this device is especially noticed in case of the helium-neon laser involving the 6328-A neon transition. This is because the emitting neon state has an energy very slightly greater than the helium metastable state from which it obtains its energy. With the ability to control the plasma temperature it is possible to control the rate at which the metastable helium state transfers its energy to the lasing helium state and an optimum of temperature can be chosen which will give a maximum amount of lasing light.

Another characteristic of this apparatus is the natural relatively large size which can be obtained. Most lasers operating so far on the continuous basis with gases have been small dimensionally and have been constructed on nonconducting materials. This has made cooling very difficult and the cooling problem has been one of the main deterrents for these devices as far as high power ratings are concerned. Since the device described here is naturally encased in metal it is possible to cool it much more efficiently and therefore to operate it at much higher power levels. Observations indicate that this is a distinct advantage.

It has been observed that in gas lasers generally the intensity of the laser light increases in direct proportion to a large power of the current, the exponent having been observed to range from two to six. This exponential relationship means of course that one is gaining laser action at an extremely significant rate when one is operating at the very high current density levels inherent in the very high power levels made possible by the above discussed structure and heat dissipating capacity of these devices.

Furthermore, in prior art lasers the two states forming the inverted population have generally both been well above the ground state in energy. It has been extremely difficult to operate a laser in which the lower state is the ground state. This has been due to the difficulty in obtaining an inverted population in such systems. With any significant concentration of gas the ground state population has usually been orders of magnitude greater than the population of the upper state.

However, in the method and apparatus of the present invention, the extremely high densities of metastable states observed make it relatively simple to obtain laser action in which one of the levels is the ground state. This is a distinct advantage for two reasons. The first reason is that the wavelength of the light is much smaller than usually found which means that each photon will have a higher energy and therefore any application in which the total energy of the photon is a consideration and in which it is desirable to increase this energy will benefit by laser action involving the ground state. Secondly, since most of the energy of the system is involved in excited atoms one can only obtain truly efficient operation of the laser when the transition is directly to the ground state so that one is using all of the energy stored in the atoms to obtain light.

We have observed that with small amounts of hydrogen as the lasing gas mixed with a major portion of helium as the buffer gas the entire hydrogen population is inverted and exists in a high energy state. Thus, it is possible to obtain laser action to the ground state from, for example, the first excited state of the hydrogen atom. This particular transition is of interest primarily because it produces one of the very few types of photons in the vacuum ultraviolet region of the electromagnetic spectrum which can be transmitted through significant distances of ordinary air. Usually air will absorb light in the vacuum ultraviolet. However, the Lyman alpha light at 1216-A wavelength which is obtained from such a system is not absorbed appreciably by ordinary air over distances less than a mile.

A second transition of special interest when one is using helium as the source of metastable states in the laser is the 584-A helium transition. Of course, it is not possible to invert the entire helium population in the device described herein. However, if one adds a small amount of helium three, the lighter isotope of helium, then the transition from the first excited state which emits to the ground state, that is the state emitting the 584-A photon for the helium three, will be shifted slightly in energy with respect to the helium four atoms. This means that it is possible to obtain the helium three in an inverted population and in this fashion to operate the laser at very nearly 100% efficiency and to emit a photon of such high energy that it is capable of ionizing any substance except helium and neon. This same principle may be applied to the helium-hydrogen laser system by doping the mixture with deuterium, a heavier hydrogen isotope. These are but two examples of a very general method of efficiently moving large amounts of radiant energy from systems producing light in the far ultraviolet by isotopic shift techniques.

While preferred embodiments of the method and apparatus have been described in detail above, together with specific characteristics and parameters thereof, and while a discussion of the underlying mechanism of operation of the devices in accordance with our present best understanding has been presented, it is to be understood that this has been done only by way of illustration and example and is not intended as a limitation on the scope of the invention which is defined by the following claims.

What is claime is:

1. The method of producing intense monochromatic light from a continuous plasma comprising the steps of:
   a. confining a gas at a controlled predetermined reduced pressure of at least 50 microns but below atmospheric pressure;
   b. independently controlling the temperature of an electron emitting cathode positioned in said gas to a constant temperature of at least 2500° K to produce an abundant supply of low-energy electrons;
   c. applying a predetermined controlled low voltage of from 20 volts to 100 volts to an anode positioned in said gas in an electrical circuit relation with said cathode in which the internal resistance of the circuit is positive so as to draw an intermediate mode current of from 0.1 amperes to less than 100 amperes from said cathode without arcing in order to produce in said confined gas a region having a high density of metastable atomic states and to thus produce from them a low temperature, high density plasma in said region, said intense monochromatic light being emitted as a result of the recombination of ions and electrons in said plasma; and
   d. establishing a preferred optical direction for light emission and output from said plasma to produce stimulation of emission of radiation in order to obtain laser action and thus produce coherent light.

2. The method according to claim 1 wherein said gas comprises a major portion of a first substance and a minor portion of a second substance.

3. The method according to claim 2 wherein said first substance is natural helium and said second substance is selected from the group comprising hydrogen, neon, argon, krypton, xenon, an isotope of these gases or an iostope of helium.

4. The method recited in claim 2 further including the steps of applying a magnetic field along said preferred optical direction and circulating said confined gas through said plasma forming region in order to remove impurities therefrom.

5. The method according to claim 1 wherein said gas is helium confined at a pressure of about 300 microns, said anode voltage is between 22 and 100 volts, said current from said cathode is more than one-tenth ampere but less than 100 amperes, and said light has a wavelength of 584-A.

6. The method according to claim 1 further including the step of dissipating heat from said anode and said cathode by placing them in heat exchange relationship with a circulating heat transfer fluid.

7. A light source comprising:
   a. means to confine a gas at a pressure above 50 microns but below atmospheric pressure;

b. output means positioned to transmit light from said confined gas;

c. at least one anode and one cathode positioned in said gas in electrical circuit relationship with each other;

d. first control means to control the voltage applied to said anode to between 20 volts and 100 volts, second control means to control the temperature of said cathode to a temperature above 2500° K by regulating power supplied to it, and third control means to control the pressure of said gas, said first, second and third control means being arranged to function independently of each other to permit independent control of the temperature and density of the plasma formed in said gas when an intermediate mode current of from 0.1 amperes to 100 amperes is drawn from said cathode to said anode; and e. optical means to establish a preferred light direction for stimulation of emission of radiation to obtain laser action.

8. Apparatus according to claim 7 wherein said gas comprises a major portion of a first substance and a minor portion of a second substance and wherein said apparatus further includes means to produce a magnetic field along said preferred light direction.

9. A laser device comprising:

a. a metallic cylindrical housing hermetically sealed by front and rear end walls;

b. means to circulate a gas through said housing at a controllable pressure reduced below atmosphere;

c. first fluid cooled supporting means to position a plurality of anodes in longitudinally spaced relationship from each other in said cylindrical housing;

d. second fluid cooled supporting means to position a corresponding plurality of cathode devices in longitudinally spaced relationship from each other in said cylindrical housing;

e. circuit means in heat conducting relation with said second fluid cooled supporting means, said circuit means connecting the plurality of cathodes in parallel circuit relationship with each other to a power supply having means to control the temperature of said cathodes by controlling the power supplied to them;

f. individual circuit means in heat conducting relation with said first fluid cooled supporting means, said individual circuit means connecting each of said plurality of anodes to a corresponding individual and separately controllable voltage supply;

g. reflecting means positioned to direct light through the plasma formed in said housing when current is drawn from said cathode to said anode;

h. and optical output means positioned to receive light from said reflecting means.

10. Apparatus according to claim 9 wherein a solenoid coil is positioned externally around said cylindrical housing to generate a magnetic field along the longitudinal axis thereof; and means to control the current supplied to said solenoid coil.

11. Apparatus according to claim 9 wherein said gas comprises a first major portion of natural helium and a second minor portion selected from the group comprising hydrogen, neon, argon, krypton, xeonon and isotope of these gases or an isotope of helium.

* * * * *